United States Patent [19]
Ohyama et al.

[11] Patent Number: 5,745,771
[45] Date of Patent: Apr. 28, 1998

[54] DISC ARRAY DEVICE AND DISC CONTROL METHOD

[75] Inventors: Mitsuo Ohyama, Hachioji; Yoshihisa Kamo, Musashimurayama; Akihiko Ohba; Hitoshi Kakuta, both of Tokyo; Toyohiko Kagimasa, Sagamihara; Hiroki Kanai, Higashiyamato, all of Japan

[73] Assignee: Hitachi, Ltd., Tokyo, Japan

[21] Appl. No.: 499,004

[22] Filed: Jul. 6, 1995

[30] Foreign Application Priority Data

| Jul. 8, 1994 | [JP] | Japan | 6-156975 |
| Jul. 19, 1994 | [JP] | Japan | 6-166552 |

[51] Int. Cl.$^6$ ................................ G06F 13/24
[52] U.S. Cl. .......................... 395/735; 395/733
[58] Field of Search .................. 395/800, 733, 395/735

[56] References Cited

U.S. PATENT DOCUMENTS

| 5,179,704 | 1/1993 | Jibbe | 395/725 |
| 5,233,594 | 8/1993 | Wilhelm | 369/75.1 |
| 5,249,279 | 9/1993 | Schmenk | 395/425 |
| 5,471,603 | 11/1995 | Yokote | 395/402 |
| 5,530,831 | 6/1996 | Akiyama | 395/441 |
| 5,530,960 | 6/1996 | Parks | 395/825 |
| 5,572,661 | 11/1996 | Jacobson | 395/182.05 |

FOREIGN PATENT DOCUMENTS

| 64-79992 | 3/1989 | Japan . |
| 3-108178 | 5/1991 | Japan . |
| 4-228153 | 8/1992 | Japan . |
| 5-298238 | 11/1993 | Japan . |

Primary Examiner—Eric Coleman
Attorney, Agent, or Firm—Fay, Sharpe, Beall Fagan, Minnich & McKee

[57] ABSTRACT

A plurality of disc units, an array control unit, and a host controller connecting mechanism for connecting them to a host controller through a system interface are mounted on the same circuit board. The order of interrupts of requests for connecting of disc units is detected, and the disc units are connected to a common bus selectively. Cables for interconnecting constituent elements of the disc array device and supporting mechanisms for the disc units can be dispensed with, and consequently the cost can be reduced. Useless rotation waiting is avoided, improving the data transfer rate. The disc array device can be built in the host device and connected directly to the system bus. Therefore the ease of operation can be improved.

8 Claims, 12 Drawing Sheets

DISC ARRAY DEVICE AND DISC CONTROL METHOD

BACKGROUND OF THE INVENTION

The present invention relates to a disc array device and a disc control method, which are suitably provided in a system or directly connected to a bus by mounting all of a plurality of small-sized disc units, a disc array control unit and a host interface connecting mechanism on a single board.

In the mounting of a disc storage device, the connections between the disc units and the disc control unit are generally effected by means of a cable, as represented by an SCSI cable.

In a disc array device in which a multiplicity of disc units need to be provided, however, these disc units are connected through a connecting printed circuit board, as disclosed in Japanese Patent Laid-Open No. 79992/1989. In Japanese Patent Laid-Open Nos. 108178/1991 and 228153/1992, on the other hand, there is disclosed a disc storage device in which a plurality of disc units are mounted on a common board.

The method of connecting the disc units and the disc control unit through cables is convenient and effective when the number of disc units to be connected is small, but a mechanism is required so as to support the discs. When more disc units are connected, the total length of cables increases, raising a problem that the data transfer rate is difficult to raise. On the other hand, for a number of disc units having a small size of below 1.8 inches, it cannot be said that the cable connecting method is suitable for a high density mounting from the standpoint of mounting efficiency of the connectors or cables in addition to the aforementioned problem.

The disc array device, as disclosed in Japanese Patent Laid-Open No. 79992/1989, needs no cable and is improved in high density mounting, but requires a support mechanism for the disc units and a mechanism for connection to the disc control unit in addition to the printed circuit board, so that an improvement has to be made for high density mounting of the small-sized disc units.

The devices disclosed in Japanese Patent Laid-Open Nos. 108178/1991 and 228153/1992 require no disc unit supporting mechanism other than the board for mounting the disc units and is considered to be a more suitable for higher density mounting of the small-sized disc units. However, these devices require a mechanism such as a separate printed circuit board for the connection to the disc control device.

In view of not only the mounting problem of the disc units but also the speed-up of the data transfer, the method of connecting the disc units to the common bus exerts a serious influence upon the performance of the disc array device when a large number of disc units are connected to the common bus.

In a disc array device, a large number of disc units are connected to an array control unit, but the connection of the disc units to the array control unit is generally effected by means of a common bus which is connected to the disc units, from the standpoint of the mounting and the cost. The common bus connected to the disc units is widely exemplified by an SCSI bus or an IDE interface bus. In the case of such common buses, only one disc unit uses the common bus at one time. In a disc array device having numerous disc units connected to a common bus and operated in parallel, therefore, the requests of connection of the disc units to the common bus is multiplexed made, so that the input/output performance is greatly influenced by not only the data transfer rate of the common bus but also the method of controlling the connection of the disc units to the common bus.

When such a common bus is used in the prior art, it is necessary to overcome the arbitration (in the case of an SCSI bus) or to request the host to allow the use of the bus from the host by interrupt processing (in the case of an IDE interface) and necessary to be allowed to use it. If the demands contend, moreover, the demands are accepted in order of priority which is determined in advance for each disc unit. As a disc unit interrupt method, in Japanese Patent Laid-Open No. 298238/1993, there is disclosed a method of collecting the interrupts from the disc units into a control interrupt line connected to the controller and informing the request.

In such a disc array device, conventionally, data are divided and stored in a plurality of disc units. The operation of the disc array is ended either when the data are stored (data write) in all the disc units or when the data are extracted (data read) from all the disc units. The parallel operation of the plurality of disc units causes a contention among the bus requests, and the connections of the disc units to the common bus and the data transfer are desirably performed before the disc units cause useless rotation waiting. Specifically, the buffer memories mounted in the disc units need to be not empty at the data writing time so that they may nor overflow at the data reading time. In other words, it is desirable that the time from the bus request to the actual connection of a disc unit to the bus is as short as possible and the variation of waiting times of the disc units is as small as possible. Moreover, the simplest and most effective connection realizing method is to connect the disc units to the common bus in order of connection request.

When, however, the requests coming from the disc units for the connection to the common bus contend, in the prior art in which connection is made in the priority order predetermined for each disc unit as described above, the waiting time of the disc unit having a low priority is long, causing a so-called "sinking" in the worst case.

In the method as disclosed in Japanese Patent Laid-Open No. 298238/1993, the control unit can quickly detect the occurrence of interrupts by disc units but can hardly grasp their sequential order when the interrupts contend. Hence, polling is necessary to specify the disc unit which generates an interrupt.

It should be noted that useless rotation waiting will easily occur due to the accumulation of variation of the waiting times for connection to the common bus among the disc units at the time of inputting/outputting a large amount of data or at the sequential access time, even if no sinking occurs and the buffer memory has a large capacity, e.g., a plurality of tracks. Consequently, it is important that the waiting time for connection of the disc units to the common bus be short to reduce the variation among the disc units.

SUMMARY OF THE INVENTION

An object of the present invention is to provide a disc array device, which is constructed of small-sized disc units so that it can be suitably used in a system or in direct connection to a bus, and a method of controlling the disc array.

An object of the present invention is to provide a disc array device, which shortens the waiting time for connecting the individual disc units to a common bus, thereby to reduce the variation among the individual disc units, and a method of controlling the disc array.

In the invention, a plurality of small-sized disc units, an array control unit for controlling the disc units, and a host controller connecting mechanism for connecting a host controller or a host computer are mounted on a common board.

The array control unit is so constructed as to include means for dividing the data coming from the host controller, means for generating parities from the data stored in the disc units, means for selecting a disc the data and parities are to be stored and inputting/outputting them, and means for reading the data divided and stored in the individual disc units and restoring them to the original data, thereby to realize RAIDs 0, 1, 3 and 5, which are methods of storing data in a disc array proposed by Patterson et al. Moreover, the host controller connecting mechanism is so constructed as to include interface means for the system bus or system interface to be connected, and a connection mechanism such as a fitting connector. The host controller connecting mechanism can be connected to the serial interface through electric or light signals by further including serial/parallel and parallel/serial converting means, photoelectric converting means and electrophotic converting means.

According to the present invention, the disc array device is mounted on a single board. As a result, no cable is required for connection between the disc units and between the disc units and the array control unit, and no mechanism for supporting the disc units is required by mounting the disc units directly on the board, so that the cost can be lowered. Moreover, it is possible to shorten the bus length for connecting the disc units and the disc control unit and to effect the connection to the host controller through the high speed serial interface, so that the data transfer rate can be easily increased. Thanks to the one-board construction, furthermore, the disc array device can be mounted directly in the slot of the system bus of the host device, so that it can be used as a high-speed internal disc array connected directly to the bus.

According to the present invention, furthermore, the disc array device having the construction in which a large number of disc units are connected to the common bus, also includes means for judging whether or not an interrupt is requested for every disc unit, means for masking the interrupts generated by the disc units, means for taking a logical OR of the masking results by the masking means for the individual disc units to effect the interrupt requests, and means for selecting and connecting the disc units to the common bus. The interrupt can be replaced by a data transfer request or a common bus connection request.

In the disc control method according to the present invention, first, interrupts by all started discs are allowed. When one of the disc units requests connection to the common bus to make an interrupt request, the interrupt request to the array controller is made. The disc unit having made the interrupt request is identified, and the interrupt request by the disc unit is then masked. As a result, the time when a subsequent interrupt request is made is the time when an interrupt request is newly made by another disc unit, so that the array control unit can identify the disc unit which has made the new interrupt request, by reading the interrupt states of the individual discs. By repeating the steps described above, the array control unit can recognize the interrupt requests of the individual disc units in the sequential order. As soon as the common bus becomes usable, the array control unit confirms that the interrupt is a data transfer request, and selects one of the disc units in order of the data transfer requests and connects it to the common bus to effect the data transfer. Thus, it is possible to reduce the variation of the waiting times for connections to the common bus among the disc units. As a result, the useless rotation waiting caused by the overflow or underflow of the buffer memory having internal disc units can be eliminated to improve the data transfer rate. In the case of a small capacity (no more than 1 track) buffer memory having internal disc units, moreover, the useless rotation waiting hardly occurs, improving the data transfer rate.

DESCRIPTION OF THE PREFERRED EMBODIMENTS

Figure 1:
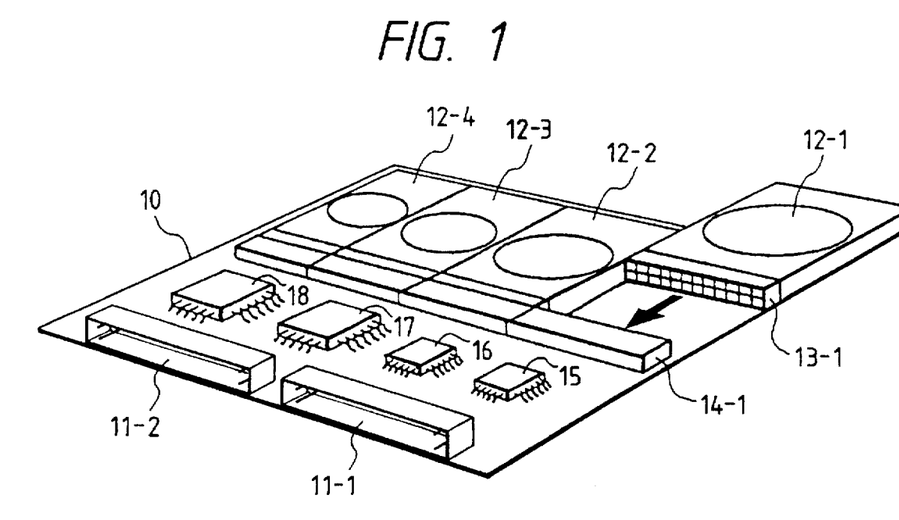
FIG. 1 is a view showing a first mounting example of a disc array device according to the present invention.

The present invention will be described in detail in connection with its embodiments with reference to the accompanying drawings. FIG. 1 is a view showing an example of the mounting of a disc array device according to the present invention, and FIG. 4 is a diagram showing the structure of the disc array device, the mounting of which is shown in FIG. 1.

A description will be made at first referring to FIG. 4. Reference numeral 1 designates a disc array device. Numerals 8-1 to 8-4 designate four small-sized disc units, which are connected to a disc interface control circuit 7 through a disc common bus 9. Numeral 6 designates a buffer memory for temporarily storing the data to be inputted/outputted to a disc unit, and numeral 5 designates a microprocessor for realizing the functions as a disc array. These components constitute an array control unit 4. In other words, the data from the host controller or the host computer are once stored in the buffer memory 6, and the microprocessor 5 decides and selects a disc unit to which to write the data. At this time, by another method for writing data in the disc unit, the data can be divided into a plurality of blocks of a predetermined size and written in a plurality of disc units. This method is known as "disc striping".

Numeral 3 designates a host interface circuit having an interface function to connect the disc array device to a system bus such as a VME or a PCI bus, or to a system interface such an SCSI bus. Numeral 2 designates a host controller connecting mechanism connected to the host controller or the host computer through a fitting connector or the like by use of electric signals or light signals. The present invention is characterized in that all the components of the disc array device thus far described, including the array control unit are mounted on a common board, as shown in FIG. 1.

Figure 4:
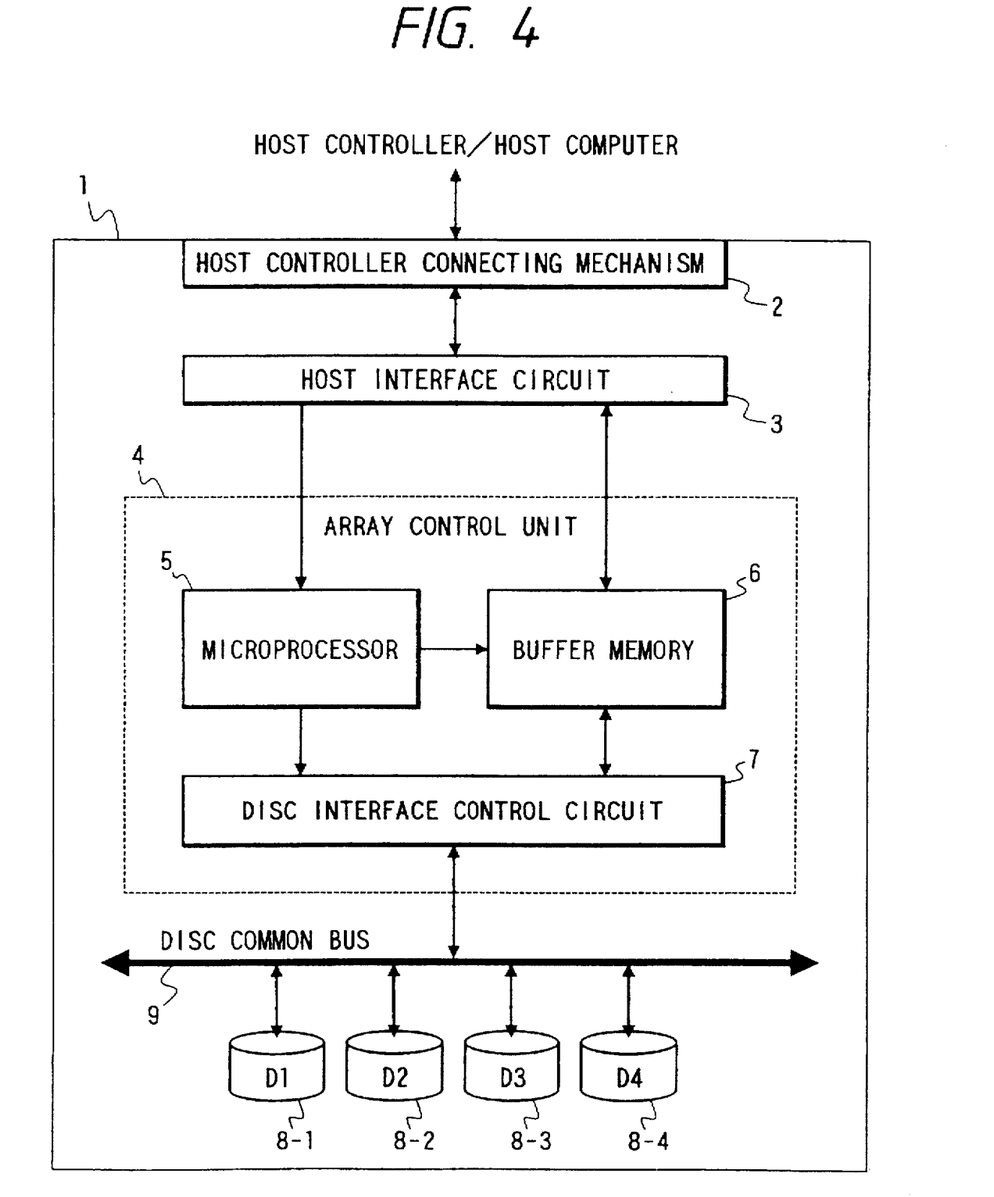
FIG. 4 is a diagram showing an example of the structure of the disc array device.

Reference numerals 12-1 to 12-4 appearing in FIG. 1 designate small-sized disc units corresponding to the disc units 8-1 to 8-4 of FIG. 4. The small-sized disc units have disc diameters of about 1 to 2 inches and can be mounted in an array on a common board. The small-sized disc units are individually mounted on a printed circuit board 10 through fitting connectors 13-1 and 14-1 and so on. Numerals 11-1 and 11-2 designate fitting connectors for effecting connection to the host controller or the host computer, which are fitted directly into the slots of the system bus of the host controller or the host computer. Numeral 15 designates an LSI chip in which is integrated the disc interface control circuit 7 of FIG. 4. Numeral 16 designates an LSI chip in which is integrated the host interface circuit 3 of FIG. 4. Numeral 17 designates an LSI chip containing the microprocessor of FIG. 4. Numeral 18 designates an LSI chip containing the buffer memory 6 of FIG. 4. These LSI chips are individually mounted directly on the printed circuit board 10. Moreover, those small-sized disc units, LSI chips and fitting connectors are interconnected, as necessary, over the printed circuit board 10. Specifically, since the disc array device 1 of FIG. 4 has all of its functions mounted on the single printed circuit board 10, it can be mounted directly in the system slot of the host controller or the host computer so that it can be used as an internal file connected directly to the bus.

As a result, no individual cables are required for connecting the small-sized disc units to each other and connecting the small-sized disc units to the individual LSI chips of the array control unit. The small-sized disc units and the array control unit can be connected thorugh a short bus and can be connected to the host controller or the host computer via a fast serial interface so that the data transfer can be accelerated. Moreover, since the small-sized disc units are mounted directly on the board, no support mechanism is required for the small-sized disc units so that the cost can be lowered.

Thus, the disc array device having the on-board small-sized disc unit together with the array control unit can be mounted in a casing body of a small-sized computer device such as a PC (i.e., Personal Computer) or a WS (i.e., Work Station). The disc array device may be constructed as an array module for personal use. In any event, a compact light-weight mounting can be realized.

Incidentally, in order to realize the one-board mounting, as shown in FIG. 1, the problem of heat liberation has to be overcome. When, however, small-sized disc units having disc diameters of about 1 to 2 inches are mounted in an array, this disc array device can be operated by natural cooling or by air cooling with a fan which is disposed in the casing having the disc array device therein. There may be influence of noise if the small-sized disc units and the array control unit are mounted on one board. However, this can be cleared by providing bypass capacitors and the like to absorb the spike currents or the like at the starting time.

Figure 2:
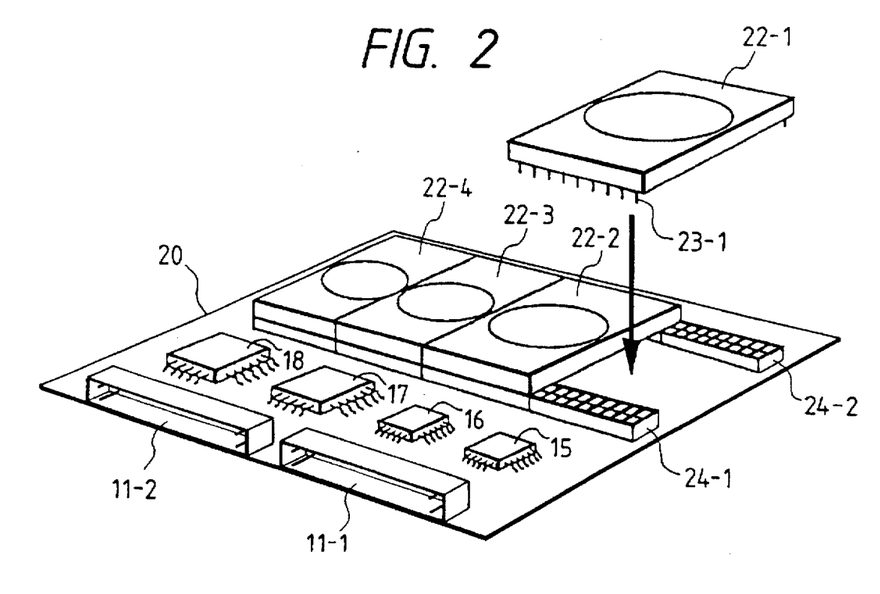
FIG. 2 is a view showing a second mounting example of a disc array device according to the present invention.

FIG. 2 shows a mounting in which the connection mechanism of the small-sized disc units is different from that of the small-sized disc units of FIG. 1. In FIG. 2, the mounting is identical to that of FIG. 1 expecting that a small-sized disc unit 22-1 is so mounted on a printed circuit board 20 that its two sides are supported by the pins 23-1 provided on the two sides of the disc unit 22-1 and board-side connectors 24-1 and 24-2. Small-sized disc units 22-2 to 22-4 are also so mounted that their respective two sides are supported. In the disc array device shown in FIG. 2, moreover, the small-sized disc units 22-1 to 22-4 can be perpetually connected, not through the connectors 24-1 and 24-2 by soldering their pins 23 directly to the printed circuit board 20 or by press-fitting their pins 23 into the through holes of the printed circuit board. In these cases, too, the effects of the present invention are not deteriorated.

According to the mounting of FIG. 2, an effect of suppressing the influence of the vibration of the small-sized disc units can be achieved in addition to the effects of the mounting of FIG. 1.

Figure 3:
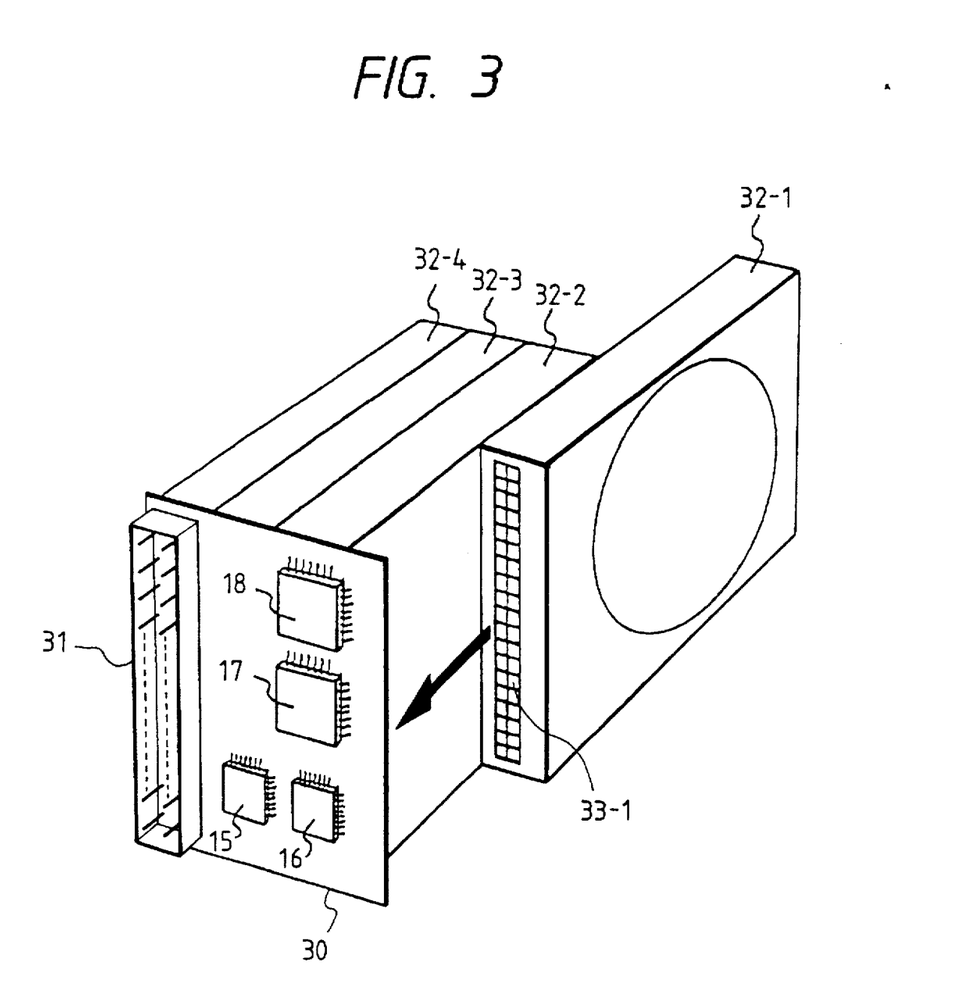
FIG. 3 is a view showing a mounting example of a disc array device according to the present invention when the data recording surface is normal to the board.

FIG. 3 shows an example in which disc units 32-1 to 32-4 are so mounted that their data recording surfaces are vertical to a printed circuit board 30. This mounting is suited for mounting such disc units with high density when the discs are too large to arrange the data recording surfaces in parallel with the printed circuit board, as in FIGS. 1 and 2. In FIG. 3, the disc units are mounted on the back of the printed circuit board 30 by a fitting connector 33-1 and so forth on the disc unit side and a (not-shown) fitting connector on the printed circuit board side. Numeral 31 designates a connector for the connection to the host controller or the host computer. When, however, the heat dissipation from the disc units is taken into consideration, it is effective to mount the disc units not close to each other but with gaps or to mount the disc units with electrically insulating members of high thermal conductivity between them.

Figure 5:
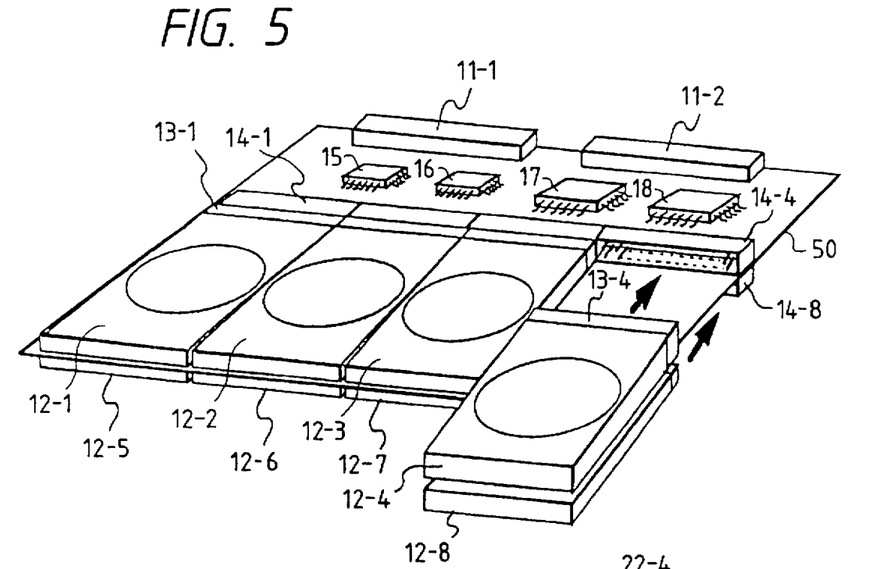
FIG. 5 is a view showing a first mounting example of a disc array device according to the present invention, in which the discs are mounted on both sides of the board.
Figure 6:
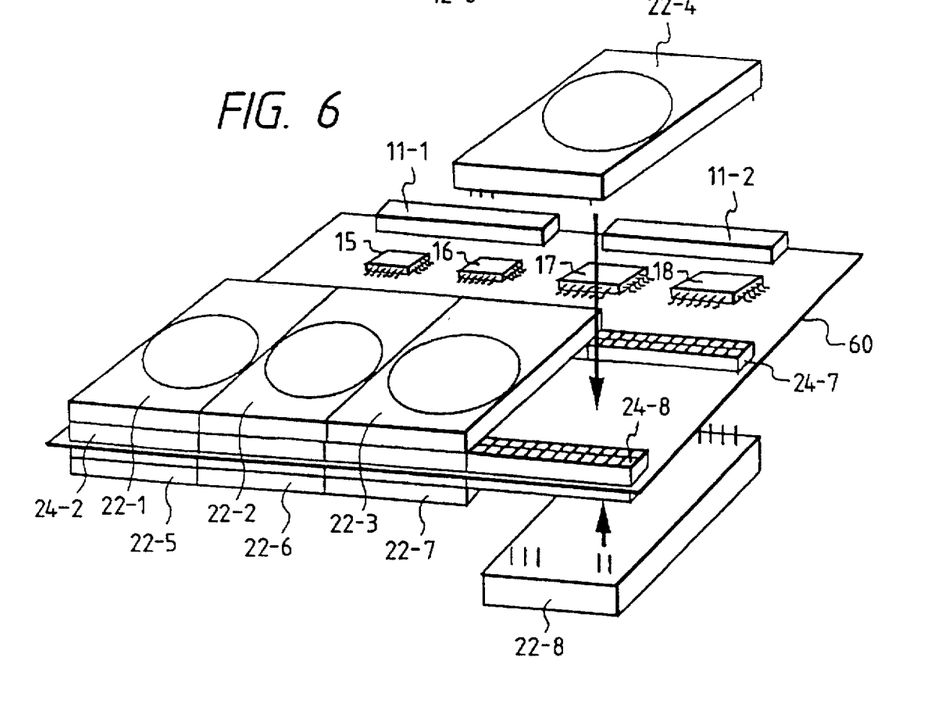
FIG. 6 is a view showing a second mounting example of a disc array device according to the present invention, in which the discs are mounted on both sides of the board.

Next, other embodiments are shown in FIGS. 5 and 6. In these embodiments, the small-sized disc units are mounted on both sides of a printed circuit board. FIG. 5 shows an embodiment in which the small-sized disc units are mounted on both sides of the printed circuit board of the embodiment of FIG. 1, and FIG. 6 shows an embodiment in which the small-sized disc units whose two edges are ends supported in the embodiment of FIG. 2 are mounted on both sides of the printed circuit board. In these embodiments, the mountings of higher densities can be achieved in addition to the effects of the embodiments shown in FIGS. 1 and 2.

Figure 8:
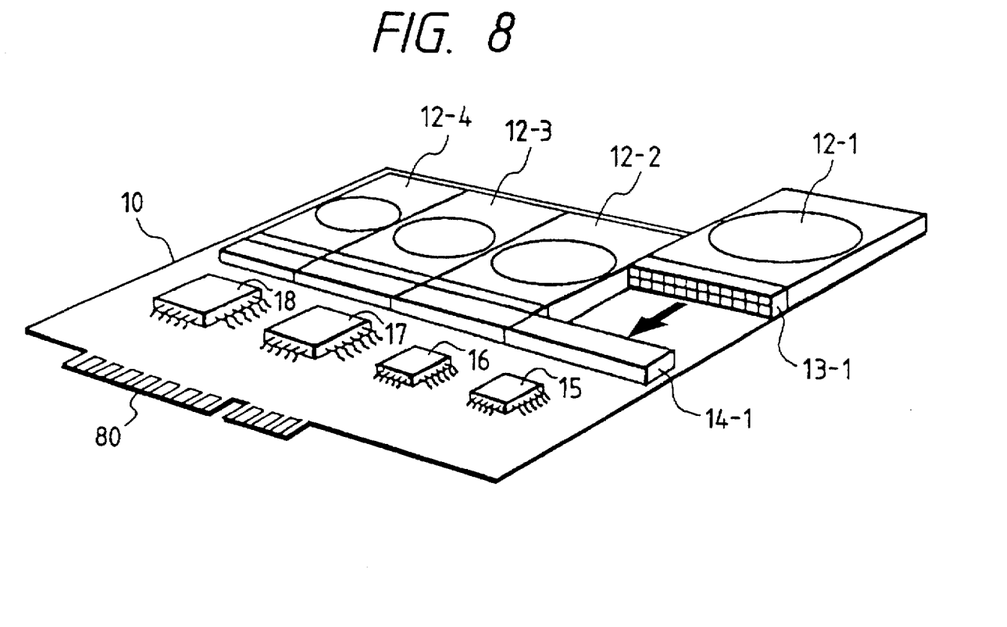
FIG. 8 is a view showing a first mounting example of the disc array device, in which a host controller connecting mechanism has a card edge connector.
Figure 9:
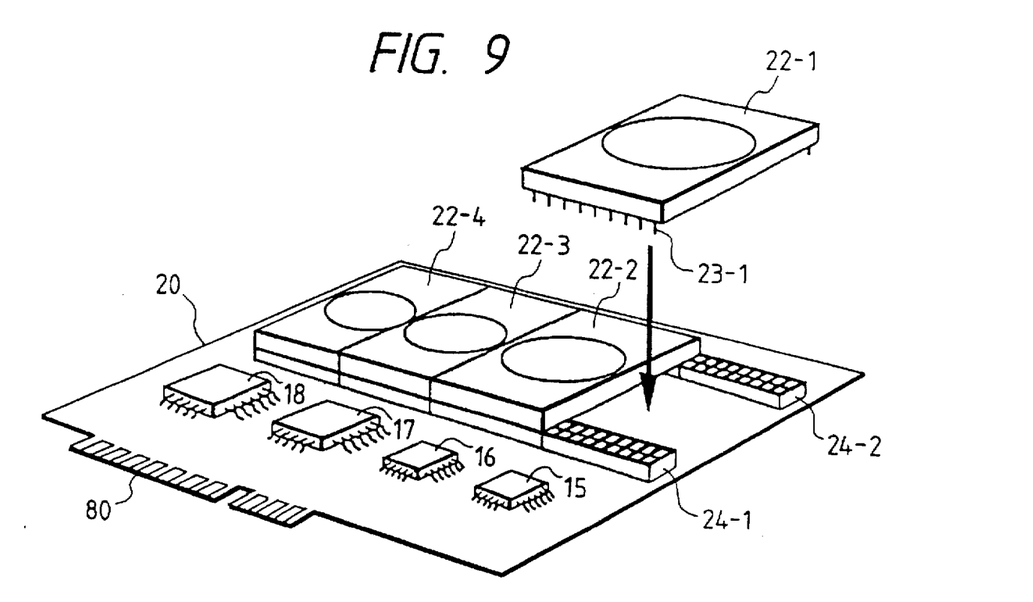
FIG. 9 is a perspective view showing a second mounting example of the disc array device, in which a host controller connecting mechanism has a card edge connector.
Figure 10:
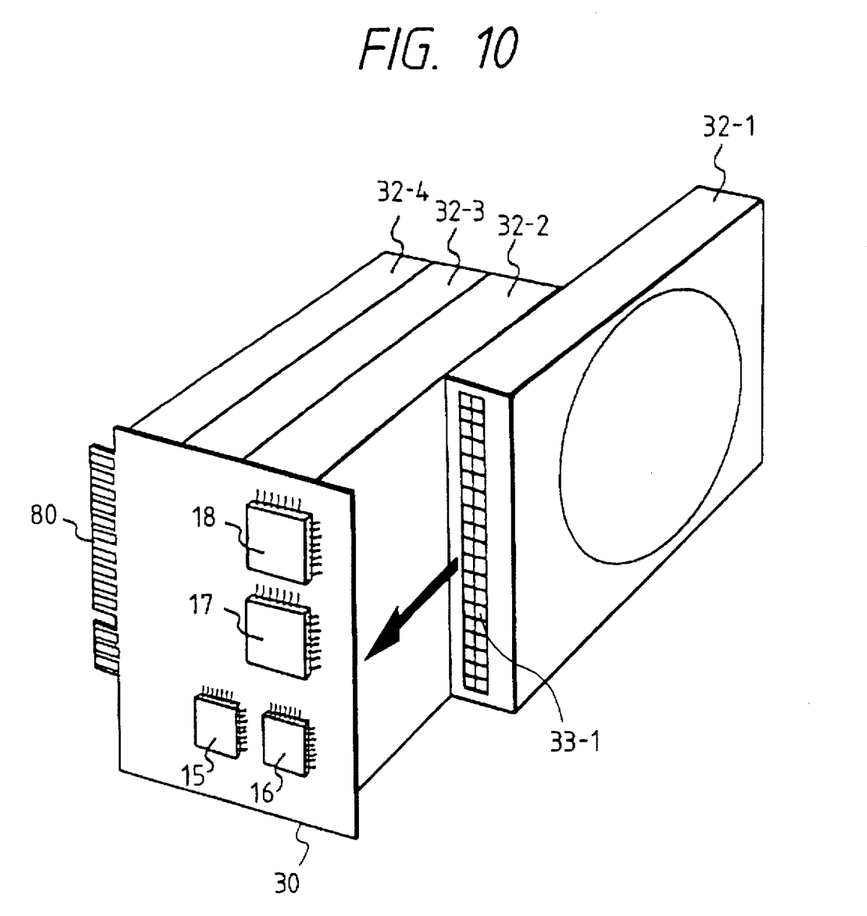
FIG. 10 is a view showing a third mounting example of the disc array device, in which a host controller connecting mechanism has a card edge connector.

In the embodiments thus far described, the connection to the host controller or the host computer are effected by the fitting connectors mounted on the printed circuit board, but the connectors may be card edge connectors directly formed on the printed circuit board. FIGS. 8, 9 and 10 show embodiments in which the host connection mechanisms of the embodiments shown in FIGS. 1, 2 and 3 are respectively formed of card edge connectors. As a result, in addition to the effects of the embodiments shown in FIGS. 1, 2 and 3, the connecting structures can be simplified, lowering the cost.

Figure 11:
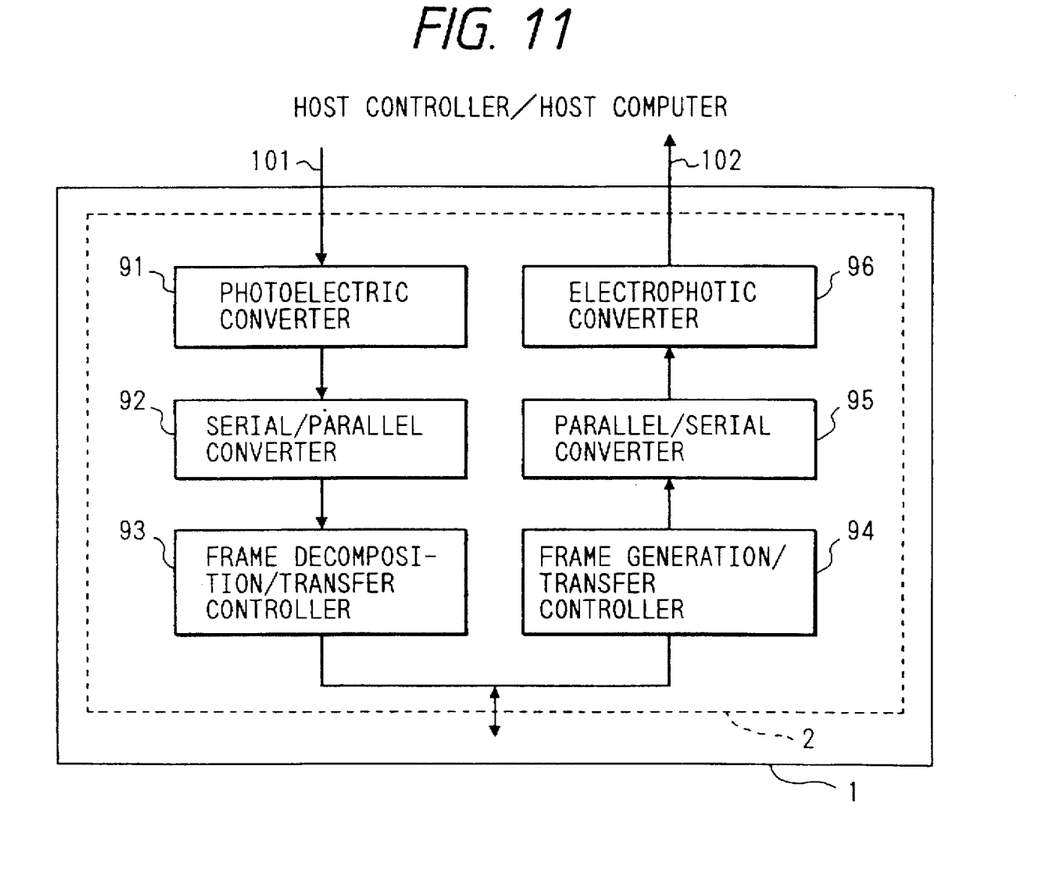
FIG. 11 is a diagram showing an example of the structure of the host control unit connecting mechanism, in which connection to a host controller through a serial interface is made.

Now, the connection to the host controller or the host computer can also be effected by a serial interface to achieve a higher-speed data transfer with fewer signal lines. In embodiments shown in FIGS. 11 and 12, the connection to the host controller or the host computer is effected through a serial interface. FIG. 11 shows another example of the structure of a disc array device 1. Light signals from the host controller or the host computer are converted by a photo-electric converter 91 into electric signals, which are further converted by a serial/parallel converter 92 into parallel signals. The parallel signals are subjected to frame decomposition by a frame decomposition transfer controller 93 and inputted to the interface circuit 3. On the other hand, signals to the host controller or the host computer are subjected to frame generation and then converted by a parallel/serial converter 95 into serial signals. This serial signal is further converted by an electrophotic converter 96 into an optical signal, which is fed to the host control unit or the host computer.

Figure 12:
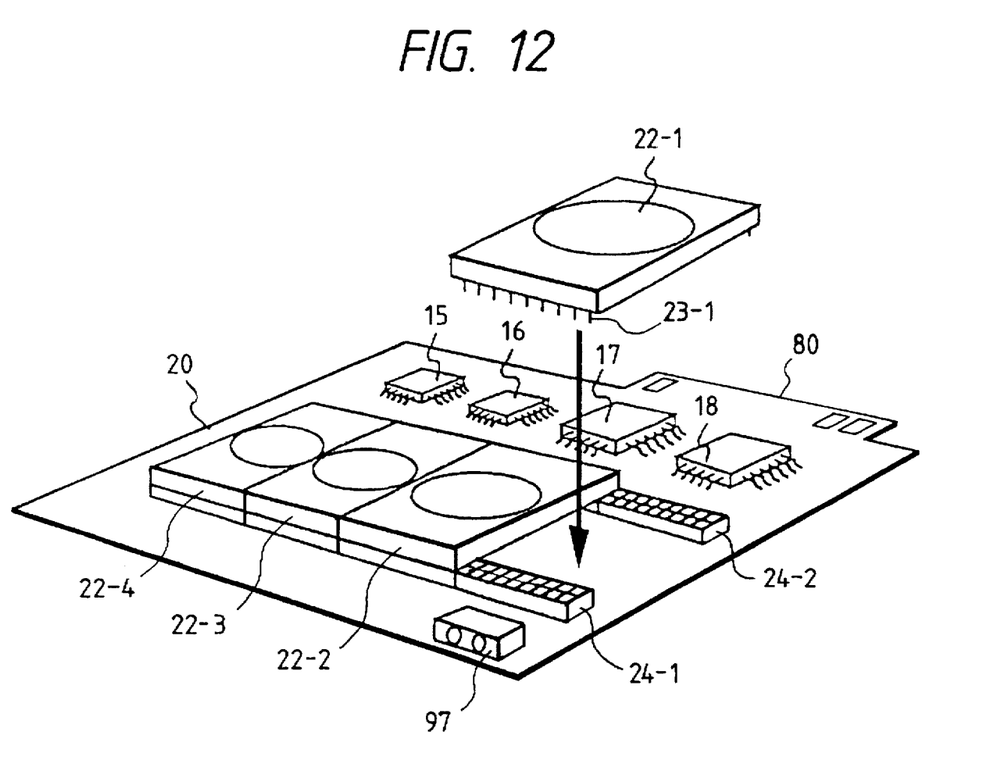
FIG. 12 is a diagram showing the mounting of an optical connection module on a disc array board.

FIG. 12 shows a mounting example on the printed circuit board in which the connection to the host controller or the host computer is effected by use of serial signals. In FIG. 12, the connection to the host controller or the host computer is effected by an optical connection module 97 mounted on a printed circuit board having the means shown in FIG. 11.

Figure 7:
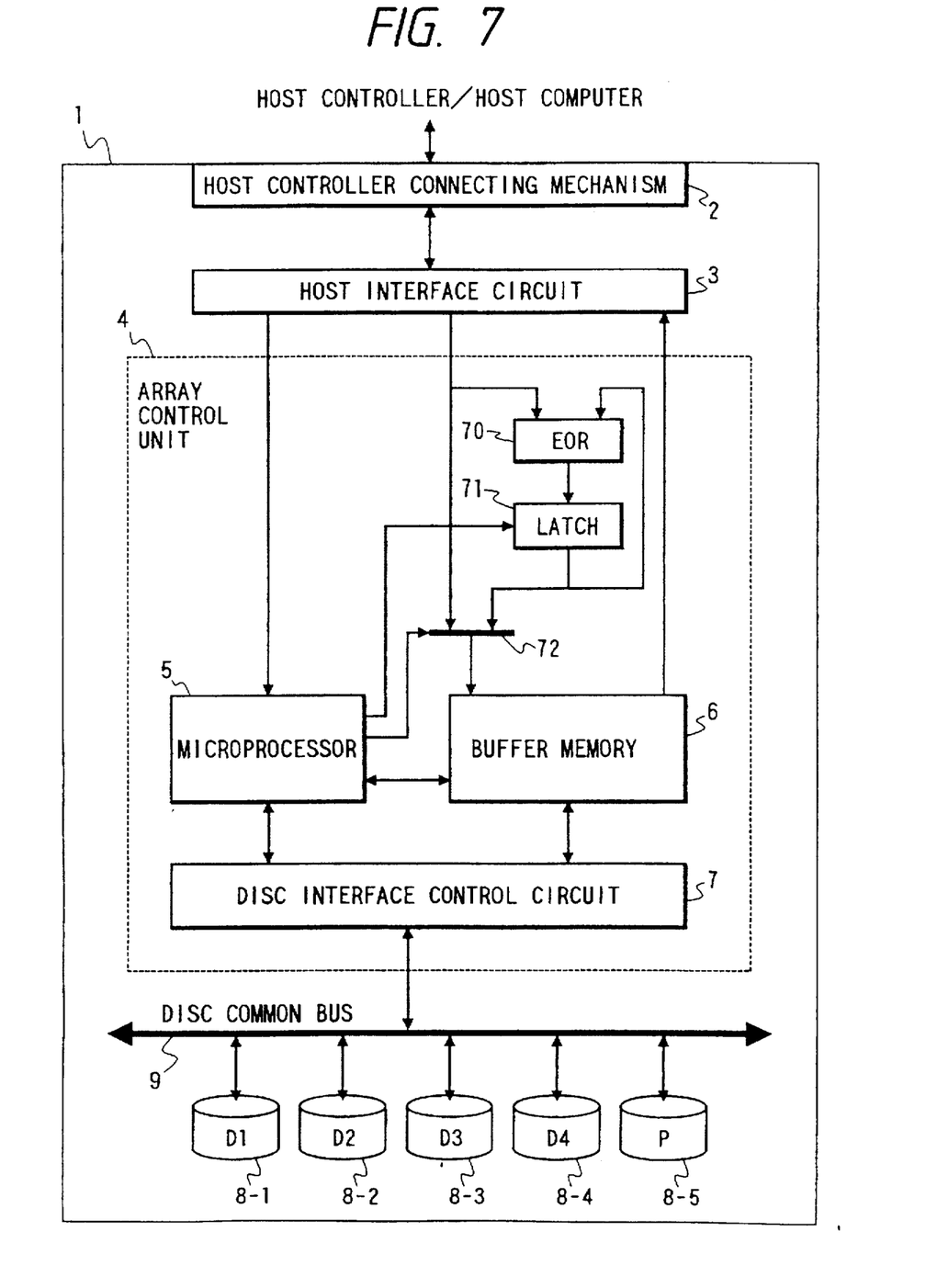
FIG. 7 is a diagram showing an example of the structure of the disc array device, in which a disc array control unit has parity generating means.

Incidentally, in the method for storing data in the disc array device it is necessary to generate parities in RAIDs 3 and 5. In this case, the array control unit 4, as shown in FIG. 7, includes an exclusive OR gate 70, a latch 71 and a selector 72 as a parity generating means.

Here will be described in detail with reference to the drawings both a disc array device control method, by which interrupts from a plurality of disc units connected to a disc common bus are recognized in order of occurence for every disc unit thereby to connect the disc units to the disc common bus in the order of data transfer requests, and a device for the method. The method and device to be disclosed hereinafter are more effective if they are mounted on one board as described before in connection with the foregoing embodiments.

Figure 13:
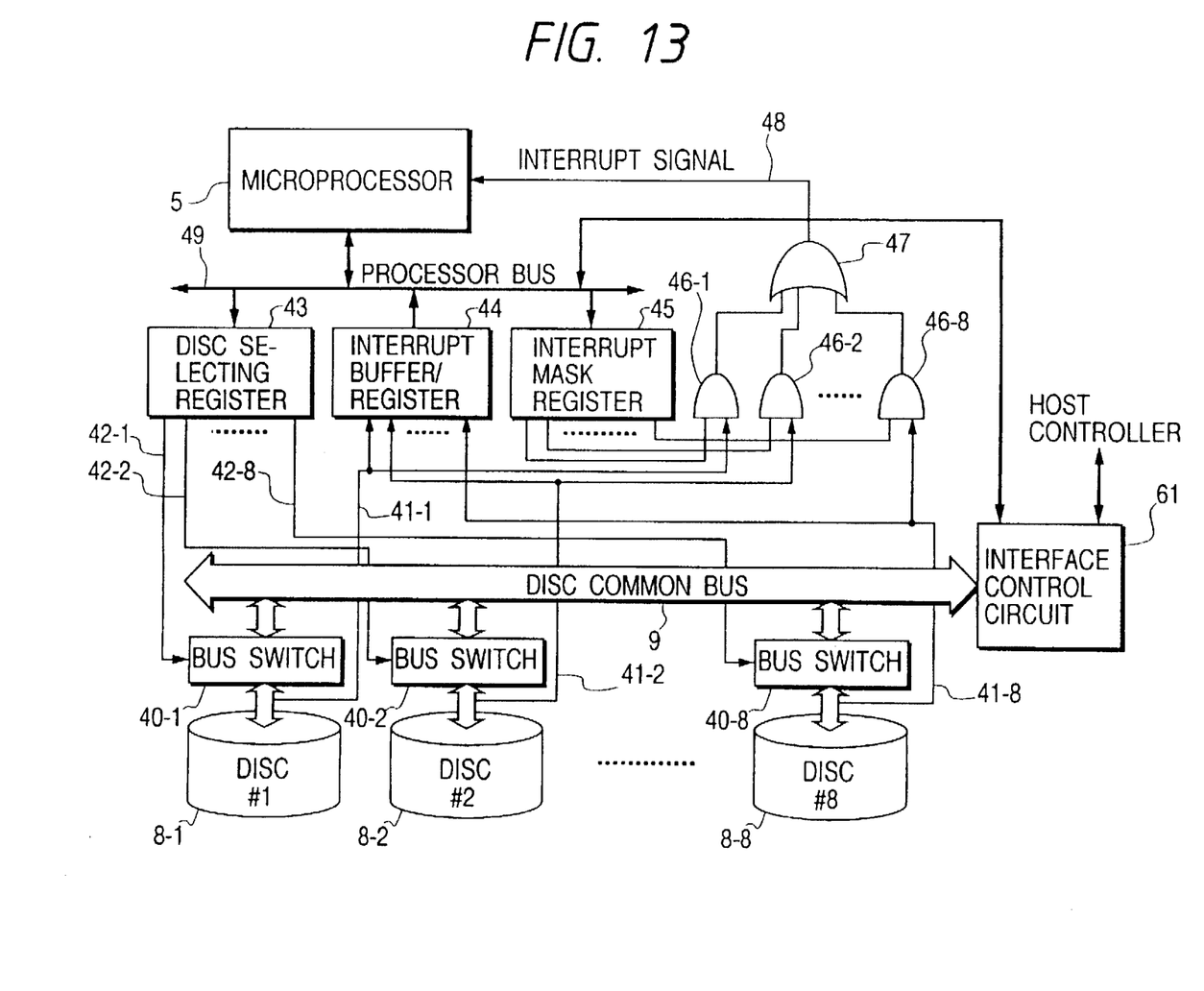
FIG. 13 is a diagram showing a hardware configuration of a disc unit connecting/controlling circuit according to an embodiment of the present invention.
Figure 14:
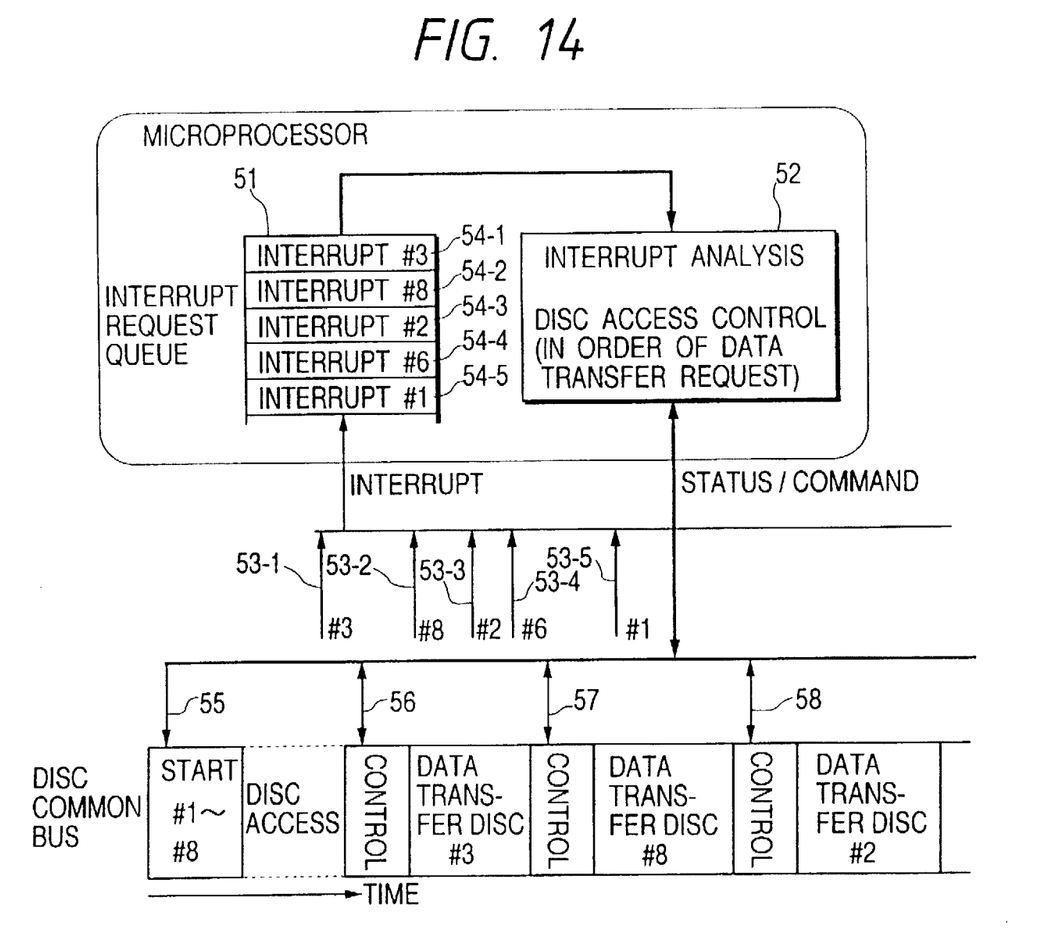
FIG. 14 is a diagram of an example of the operation of the hardware shown in FIG. 13.
Figure 15:
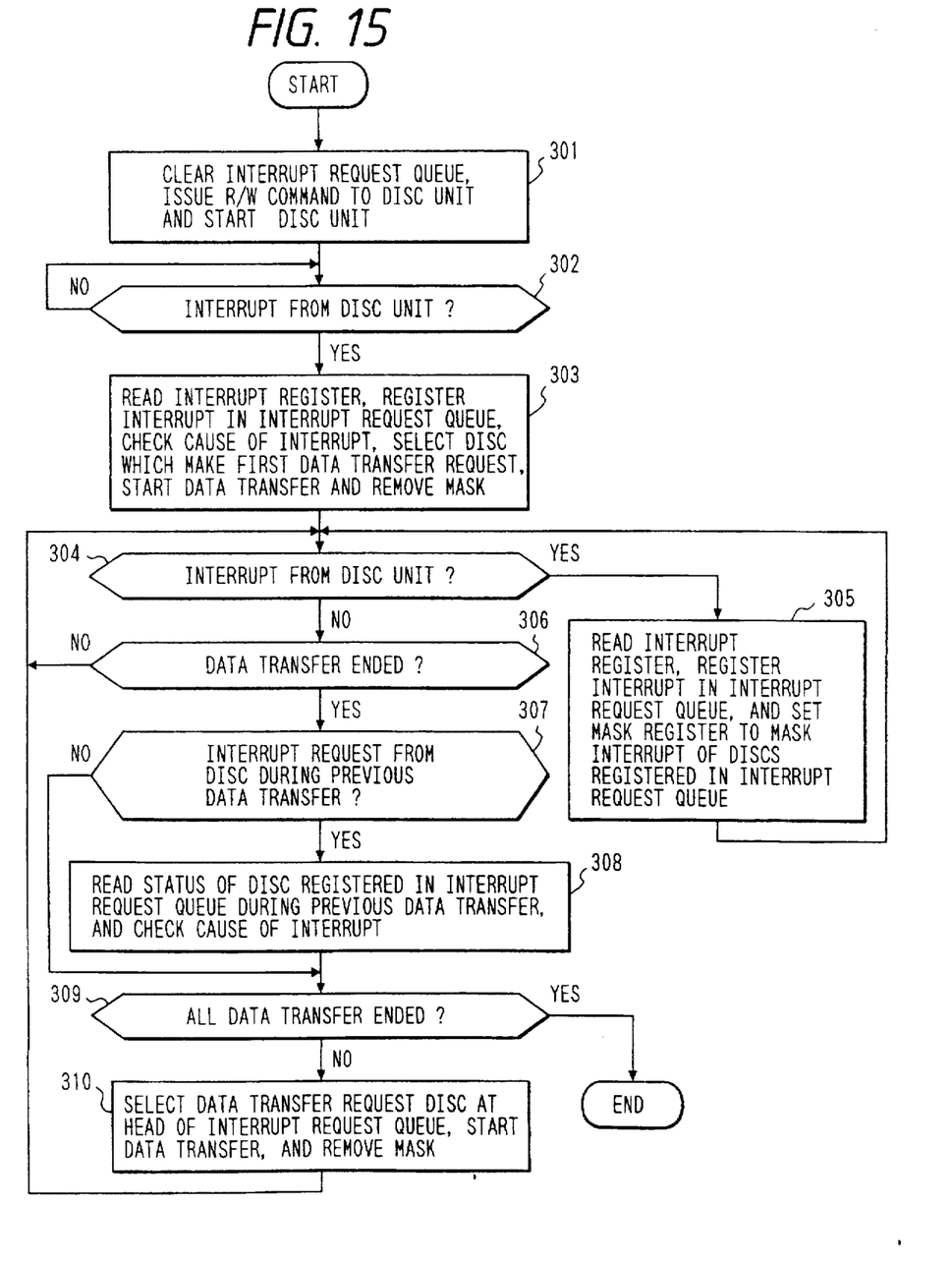
FIG. 15 is a flow chart for explaining a control program to be executed by a microprocessor 5 of FIG. 13.

FIG. 13 is a diagram showing a hardware construction of a disc array device of another embodiment of the present invention; FIG. 14 is a diagram for explaining the control method; and FIG. 15 is a diagram showing the control flow of the method.

In FIG. 13, reference numerals 8-1 to 8-8 designate eight disc units which are connected to the disc common bus 9 through bus switches 40-1 to 40-8. These disc units can be individually turned on/off by setting a disc selecting register 43 by the control microprocessor 5 to control the aforementioned bus switches. Numerals 41-1 to 41-8 designate the individual interrupt requests coming from the disc units 8-1 to 8-8. These requests are sent through an interrupt buffer/register 44 to the microprocessor 5 to judge whether or not an interrupt is requested for every disc unit. A logic AND of each bit of the interrupt mask register 45 set by the microprocessor and the AND gates 46-1 to 46-8 is taken with respect to the interrupt request for every disc unit. These results are subjected to a logical OR by an OR gate 47 to produce an interrupt signal 48 to be fed to the microprocessor 5. Numeral 61 designates an interface control circuit which is instructed by the microprocessor 5 to control not only the disc common bus 9 but also the connection to the host controller or the host computer. Thanks to the structure described above, the data transfer request from the individual disc units are recognized in order of request by the microprocessor 5, and the disc units are connected to the disc common bus 9 in order of request, so that the data transfer can be effected. Here in FIG. 13, the microprocessor 5, the disc selecting register 43 the interrupt buffer/register 44, the interrupt mask register 45, the AND gates 46-1 to 46-8, the OR gate 47 and so on constitute altogether an array control unit.

When a large number of disc units are connected to an array control unit, the disc common bus such as an SCSI bus or an IDE interface bus is used in the prior art. In the SCSI bus, however, the priority given in advance to the disc units is followed when the requests of using the disc common bus contend. When, however, the disc units are subjected to parallel processings for writing and reading data, it is desirable to shorten the waiting time from the bus using request to the bus connection and to make uniform the individual disc unit waiting time periods.

The embodiment realizes the shortening and uniforming of the waiting times. The interrupts of all started discs are allowed at first. When a disc unit requests the connection to the disc common bus, outputting an interrupt, this disc unit is recognized, and its interrupt request is masked. The next interrupt is requested when a request is newly issued by another disc unit. Thus, the disc unit having newly issued an interrupt request can be identified by reading in the interrupts of the individual disc units. By repeating these steps, the interrupt requests of the individual disc units can be recognized in order of occurrence. As soon as the disc common bus becomes usable, the data transfer is executed by confirming that the interrupt is the data transfer request and by selecting the disc units in order of the data transfer requests and the selected ones are connected to the common bus. This can shorten the variation of the waiting times of the connection to the disc common bus among the disc units. As a result, the useless rotation waiting caused by the overflow or underflow of the buffer memory having internal disc units can be eliminated to improve the data transfer rate. When the buffer memory having the internal disc units has a small capacity, moreover, the necessity of useless rotation waiting can be reduced to improve the data transfer rate.

The reading of the RAID 3 for reading out data separately stored in eight disc units will be specifically described by way of an example with reference to FIGS. 13 and 14.

In FIG. 14, reference numeral 51 designates an interrupt queue for storing the interrupts of the disc units in the request order, numeral 52 designates a control program by which the interrupt requests are fetched from the interrupt queue 51 and analyzed, the discs are connected to the common bus 9, and the data transfer is controlled. This control program is executed by the microprocessor 5. First of all, the individual disc units 8-1 to 8-8 are started by the microprocessor 5 (55). If, at this time, the bus switches of the plurality of disc units are turned on by the disc selecting register 43, the command broadcast is possible, and the disc units can be started simultaneously. Each disc unit positions (or accesses) the head to the specified cylinder, track and sector, reads data to be transferred to the host, stores them in the internal buffer memory, and then issues an interrupt of requesting the data transfer. At this time, the interrupt issuing timings of the individual disc units are generally different due to the asynchronous spindle rotation and the variation of the seeking times. In FIG. 14, a disc unit #3 issues at first an interrupt 53-1, which is fed to the microprocessor 5 by the interrupt signal 48, so that the microprocessor 5 is informed of the interrupt request of the disc unit #3 by reading in the interrupt buffer/register 44. Therefore, the microprocessor 5 registers the interrupt 54-1 of the disc unit #3 in the interrupt queue 51, sets the corresponding bit of the interrupt mask register 45 to zero, and masks the interrupt from the disc unit #3 by the AND gate 46-3 (not shown). As a result, the disc unit which subsequently interrupts the microprocessor 5 is another disc unit other than #3. The interrupt analysis/disc control progam 52 fetches the interrupt request 54-1 of the disc unit #3 from the interrupt request queue 51, sets the corresponding bit of the disc selecting register 43, connects the disc unit #3 to the disc common bus 9 and reads the status of the disc unit #3 thereby to confirm the data transfer request. After this, the program instructs the disc unit #3 on the data transfer through the interface control circuit 61, and sets the corresponding bit of the interruption mask register 45 to 1, thereby to allow again the interrupt of the disc unit #3. The interrupts 53-2, 53-3 and 53-4, which are consecutively issued during the data transfer of the disc unit #3 from disc units #8, #2 and #6, can be stored in the interrupt queue 51 in order of interrupt occurrence in accordance with the aforementioned procedure. After the end of the data transfer of the disc unit #3, the disc unit #8, the disc unit #2 and the disc unit #6 are then connected in the interrupt occurrence order to the disc common bus 9 and the data are transferred.

The method thus far described is realized by the control of the microprocessor 5. The flow of this control program is shown in and described with reference to FIG. 15. First of all, the interrupt request queue 51 is cleared and a command to start the disc units is issued (301). Then, an interrupt request from any one of the disc units is awaited (at 302). When an interrupt request occurs, the interrupt register 44 is read, the disc unit which has issued the interrupt request is identified and registered in the interrupt request queue 51, and the interrupt of the registered disc unit is masked. Next, the interrupt request is read out from the interrupt queue to set the corresponding bit of the disc selecting register 43, the disc unit having issued the interrupt request is connected to the disc common bus, and the status is read out to confirm the data transfer request. After this, the data transfer is started to remove the interrupt mask of the disc unit having started the data transfer (at 303). Interrupts from other disc units during the data transfer are monitored (at 304). If an interrupt occurs, the interrupt buffer/register 44 is read to register the interrupt in the interrupt request queue, and the interrupt of the registered disc unit is masked (at 305). When the end of the data transfer is detected (at 306), the interrupts coming from other disc units having been registered during the preceding data transfer are examined (at 307), and the statuses of the disc units of which the interrupts are registered are read out to confirm the data transfer requests (at 308). It is then examined whether or not all the data transfers have been ended (at 309). If all data transfer have ended, the end of the data transfer means that the data transfer as of the whole disc array has ended. Otherwise, the data transfer requesting disc unit at the head of the interrupt request queue is selected and connected to the disc common bus, the data transfer is started, the interrupt mask of the disc unit having started the data transfer is removed (at 310), and the routine returns to step 304.

Here in the present embodiment, for the interrupt requests 41-1 to 41-8 coming from the individual disc units, individual interconnection is necessary, but it is more effective to adopt one-board mounting such that the disc array device including the disc units described in the embodiments of the preceding half and the array control unit are mounted on a single board. In short, the printed wiring on the board can be advantageously employed for the interconnection because the individual disc units and the array control unit are present on the board.

As a result, even in the one-board mounting, it is possible to reduce the variation of the waiting times for connecting the individual disc units to the common bus. Thus, even if the internal buffer memories of the disc units have insufficient capacities, the useless rotation waiting hardly occurs, a fast data transfer can be effected, and the performance of the disc array device itself is improved.

We claim:

1. A disc array device, comprising:
 a plurality of disc units;
 an array control unit for storing data from a host controller or a host computer, a common bus connected to said plurality of disc units and said array control unit; and signal lines for transferring interrupts to said array control unit from said plurality of disc units, said array control unit including:
 means for detecting the interrupts individually via said signal lines from said plurality of disc units, for every disc unit;
 means for masking said interrupts individually for every disc unit;
 means for taking a logical OR of the masking result by said masking means, for every disc unit, to make an interrupt request; and
 means for connecting said plurality of disc units selectively to said common bus;
 wherein the order of occurrence of interrupt requests made by said plurality of disc units is recognized to judge the data transfer request order of said disc units from the order of occurrence of the interrupt requests, thereby to connect said plurality of disc units to said common bus in said data transfer request order; and
 a host controller connecting mechanism for connecting said array control unit to said host controller or said host computer through a system bus or a system interface,
 wherein said plurality of disc units, said array control unit, and said host control unit connecting mechanism are mounted on the same board.

2. A disc array device according to claim 1,
 wherein said plurality of disc units are simultaneously connected to said common bus to write data or command in said plurality of disc units simultaneously.

3. A disc array device, comprising:
 a plurality of disc units;
 an array control unit for storing data from a host controller or a host computer, a common bus connected to said plurality of disc units and said array control unit; and signal lines for transferring interrupts to said array control unit from said plurality of disc units, said array control unit including:
 means for reading the interrupts individually via said signal lines from said plurality of disc units for every disc unit;
 means for masking said interrupts individually for every unit;
 means for taking a logical OR of the masking result by said masking means, for every disc unit, to make an interrupt request; and
 means for connecting said plurality of disc units selectively to said common bus; and a host controller connecting mechanism for connecting said array control unit to said host controller or said host computer through a system bus or a system interface;

wherein said plurality of disc units, said array control unit, and said host control unit connecting mechanism are mounted on the same board.

4. A disc array device according to claim 3, wherein said means for effecting the connection to said common bus connects said plurality of disc units individually to said common bus through bus switches to turn on/off said bus switches individually.

5. A disc array device comprising:

a plurality of disc units;

a common bus connected to said plurality of disc units;

signal lines for transferring interrupts from said plurality of disc units;

means for detecting the interrupts individually via said signal lines from said plurality of disc units, for every disc unit;

means for masking said interrupts individually for every disc unit;

means for taking a logical OR of the masking result by said masking means for every disk unit to make an interrupt request; and means for connecting said plurality of disc units selectively to said common bus;

wherein the order of occurrence of interrupt requests made by said plurality of disc units is recognized to judge the data transfer request order of said disc units from the order of occurrence of the interrupt requests, thereby to connect said plurality of disc units to said common bus in said data transfer request order.

6. A disc array device, comprising:

a plurality of disc units;

a common bus connected to said plurality of disc units;

signal lines for transferring interrupts from said plurality of disc units;

means for reading the interrupts individually via said signal lines of said plurality of disc units, for every disc unit;

means for masking said interrupts individually for every disc unit;

means for taking a logical OR of the masking result by said masking means for every disc unit to make an interrupt request; and means for connecting said plurality of disc units selectively to said common bus.

7. A disc control method for a disc array device including a plurality of disc units, a common bus connected to said plurality of disc units, and an array control unit connected to said common bus, comprising the steps of:

detecting interrupts of said plurality of disc units via signal lines for transferring interrupts from said plurality of disc units, for every disc unit;

masking said interrupt for every disc unit;

taking a logic OR of the masking result for every said disc unit to make an interrupt request; and connecting said plurality of disc units selectively to said common bus.

8. A disc control method for a disc array device including a plurality of disc units, a common bus connected to said plurality of disc units, and an array control unit connected to said common bus, comprising:

reading interrupts of said plurality of disc units via signal lines for transferring interrupts from said plurality of disc units, for every disc unit;

masking said interruptions individually for said disc units;

taking a logic OR of the masked result for each of said disc units to make an interrupt request; and connecting said plurality of disc units selectively to said common bus.

* * * * *